United States Patent [19]

Hatanai et al.

[11] Patent Number: 4,657,812
[45] Date of Patent: Apr. 14, 1987

[54] RECORDING MEDIUM FOR PERPENDICULAR MAGNETIZATION

[75] Inventors: Takashi Hatanai, Nagaoka; Koichi Mukasa, Koide; Keishi Nakashima; Hiroshi Sato, both of Nagaoka, all of Japan

[73] Assignee: Alps Electric Co., Ltd., Japan

[21] Appl. No.: 687,637

[22] Filed: Dec. 31, 1984

[30] Foreign Application Priority Data

Dec. 29, 1983 [JP] Japan .................... 58-247368

[51] Int. Cl.$^4$ ............................. B32B 15/02
[52] U.S. Cl. .................... 428/328; 428/694; 252/62.54
[58] Field of Search ............ 428/900, 328, 694; 427/128; 252/62.54

[56] References Cited

U.S. PATENT DOCUMENTS

| | | | |
|---|---|---|---|
| 3,726,714 | 4/1973 | Haines | 252/62.54 X |
| 4,137,342 | 1/1979 | Kanten | 428/694 X |
| 4,137,361 | 1/1979 | Deffeyes et al. | 428/694 X |
| 4,277,809 | 7/1981 | Fisher et al. | 428/900 X |
| 4,310,599 | 1/1982 | Akashi et al. | 428/694 X |
| 4,382,110 | 5/1983 | Takagi et al. | 428/694 X |
| 4,515,856 | 5/1985 | Matsumoto | 428/328 X |

Primary Examiner—Nancy Swisher
Attorney, Agent, or Firm—Guy W. Shoup

[57] ABSTRACT

A magnetic recording medium for perpendicular magnetization includes a base of a nonmagnetic material, and a magnetic layer having perpendicular magnetic anisotropy on at least a face side of the base, the magnetic layer being composed of cobalt as a main component with carbon added thereto.

3 Claims, 6 Drawing Figures

RECORDING MEDIUM FOR PERPENDICULAR MAGNETIZATION

BACKGROUND OF THE INVENTION

The present invention relates to a magnetic recording medium, and more particularly to a magnetic recording medium capable of perpendicular magnetization recording.

Magnetic recording utilizing perpendicular magnetization has been studied in recent years for increasing the recording density of magnetic recording mediums. The magnetic recording medium used in this type of magnetic recording is composed of a base made of a nonmagnetic material, a first megnetic layer made of a soft magnetic material coated on a surface of the base, and a second magnetic layer having perpendicular anisotropy and coated on a surface of the first magnetic layer. Desired data can be recorded in a high density by magnetizing the second magnetic layer in a transverse direction thereof or a perpendicular direction.

FIG. 1 of the accompanying drawings shows in cross section such a magnetic medium for perpendicular magnetization and a recording head used for perpendicular magnetization. The base 1 is made of a non-magnetic material such as synthetic resin such as polyester or polyimide or an aluminum sheet subjected to anodic oxidization. The first magnetic layer 2 of a soft magnetic material and the second magnetic layer 3 are successively formed on the surface of the base 1 to thereby construct the perpendicular-magnetization recording medium in the form of a tape or a disk.

The recording head is composed of a main magnetic pole 5 and an auxiliary magnetic pole 6 which are disposed one on each side of the magnetic recording medium. The main magnetic pole 5 has a thickness of about $1\mu$ and is deposited as by sputtering on one surface of a support body 4 made of a nonmagnetic material such as glass or polyimide. A predetermined number of turns of an exciting coil 7 are wounded around the auxiliary magnetic pole 6. When the main magnetic pole 5 is excited from the auxiliary magnetic pole 6 by passing a signal current to be recorded through the exciting coil 7, a strong perpendicular magnetic field is generated in the vicinity of the tip end of the main magnetic pole 5 for magnetically recording the signal on the second magnetic layer 3 confronting the main magnetic pole 5.

For proper recording on the second magnetic layer 3 in perpendicular magnetization recording, it is necessary that the tip end of the main magnetic pole 5 be located so closely to the second magnetic layer 3 that the main magnetic pole 5 is held in contact with the second magnetic layer 3.

With the conventional magnetic recording mediums, the first magnetic layer 2 is made of an alloy of iron and nickel or permalloy composed of such an alloy with copper and molybdenum added thereto, and the second magnetic layer 3 is made of an alloy of cobalt and chromium. Cobalt is of a hexagonal close-packed lattice (h, c, p) structure having a large crystallomagnetic anisotropy in the direction of the c-axis, and hence is used as a main component of the second magnetic layer 3.

Since the second magnetic layer 3 is constituted of an alloy of cobalt and chromium in the conventional perpendicular-magnetization recording medium, a coefficient of dynamic friction of the second magnetic layer 3 with respect to the main magnetic pole is high and the second magnetic layer 3 is less slidable, the coefficient of dynamic friction being increased as the sliding movement is repeated. The second magnetic layer 3 is liable to be worn or peeled off during use, making the service life of the magnetic recording medium shorter or damaging the magnetic head.

To eliminate the above drawback, it has been attempted to form a lubricating protective film on the surface of the second magnetic layer 3. The protective film however keeps the second magnetic layer 3 and the main magnetic pole 5 substantially spaced from each other, with the results that the advantage of the second magnetic layer 3 with cobalt serving as a main component will not sufficiently be exhibited, and performance is lowered.

SUMMARY OF THE INVENTION

It is an object of the present invention to provide a recording medium for perpendicular magnetization which will eliminate the above prior art difficulties, and has good slidability and magnetic characteristics.

To achieve the above object, according to the present invention, a magnetic layer having perpendicular magnetic anisotropy is disposed on at least a face side of a base made of a nonmagnetic material, the magnetic layer being magnetized in a transverse direction thereof. The magnetic layer is composed of cobalt as a main component having a hexagonal close-packed lattice (h, c, p) structure having a large crystallomagnetic anisotropy in the direction of the c-axis, with carbon added uniformly thereto.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A base is made of crystalline glass, and pellets of carbon are disposed on an 8-inch-diameter cobalt disk radially from the center thereof. Alloy compositions can be varied by adjusting the number of pellets on the target. After a high vacuum of $10^{-7}$ Torr has been developed, an argon gas is introduced until a gas pressure of 10 mm Torr is achieved. Sputtering is effected with a high-frequency electric power of 500 W to produce a thin film of two-element alloy of cobalt and carbon on the base, the film having a thickness of 0.3 $\mu$m.

Products produced as described in the previous paragraph can be varied by interposing a magnetic thin layer comprising a soft magnetic material between the base layer and the cobalt-carbon layer. The middle layer corresponds to the conventional first layer described above and can be similarly constructed with a material such as permalloy, that is an alloy of iron and nickel or an alloy with added copper and molybdenum.

Two and three layered magnetic recording media within the scope of the invention are similarly prepared and are employed in the various tests described hereinafter.

Figure 1:
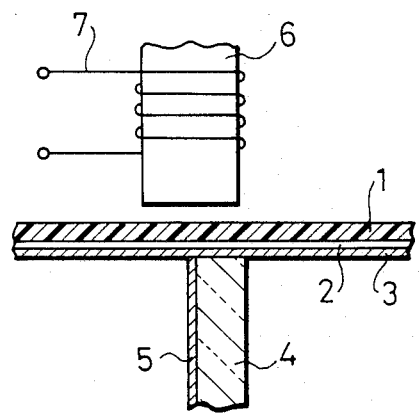
FIG. 1 is a cross-sectional view of a recording medium for perpendicular magnetization and a recording head for perpendicular magnetization.
Figure 2:
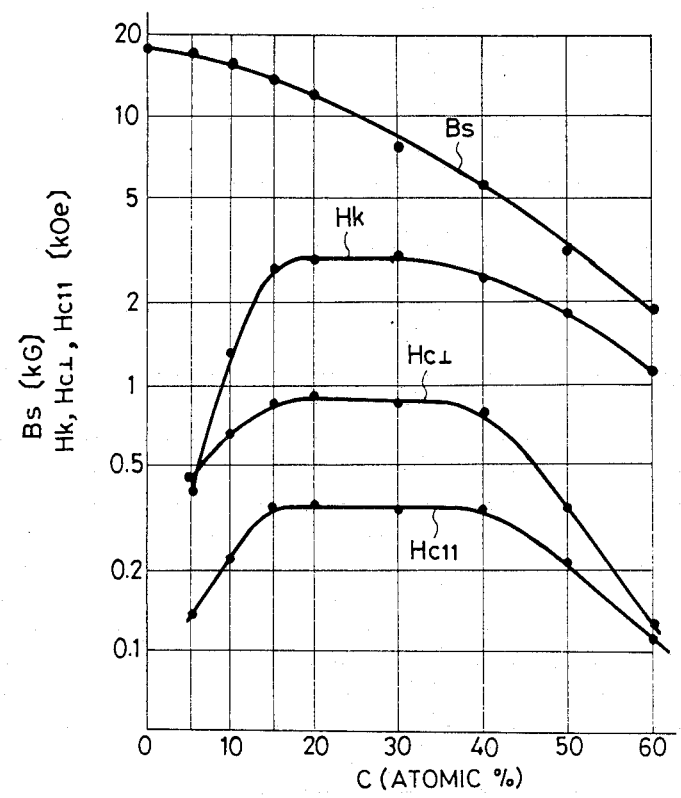
FIG. 2 is a diagram showing the relationship between a carbon content and magnetic characteristics of a recording medium for perpendicular magnetization according to the present invention.

FIG. 2 is illustrative of various characteristics such as a saturation magnetic flux density (Bs), a perpendicular anisotropic magnetic intensity (Hk), a perpendicular coercive force (Hcl), and a horizontal coercive force (Hcll) in the plane of the film.

As is apparent from FIG. 2, Bs becomes gradually lower but Hk, Hcl, Hcll becomes higher as more carbon is added, thus improving these magnetic characteristics. If the carbon content exceeds 50 atomic %, all of Bs, Hk, Hcl, Hcll tend to be lowered. Therefore, the carbon content should be in the range of about 10 to 50 atomic %. Preferably, the carbon content should range from about 15 to 40 atomic % since Hk, Hcl, Hcll have high values and their performances are substantially constant in that range.

Figure 3:
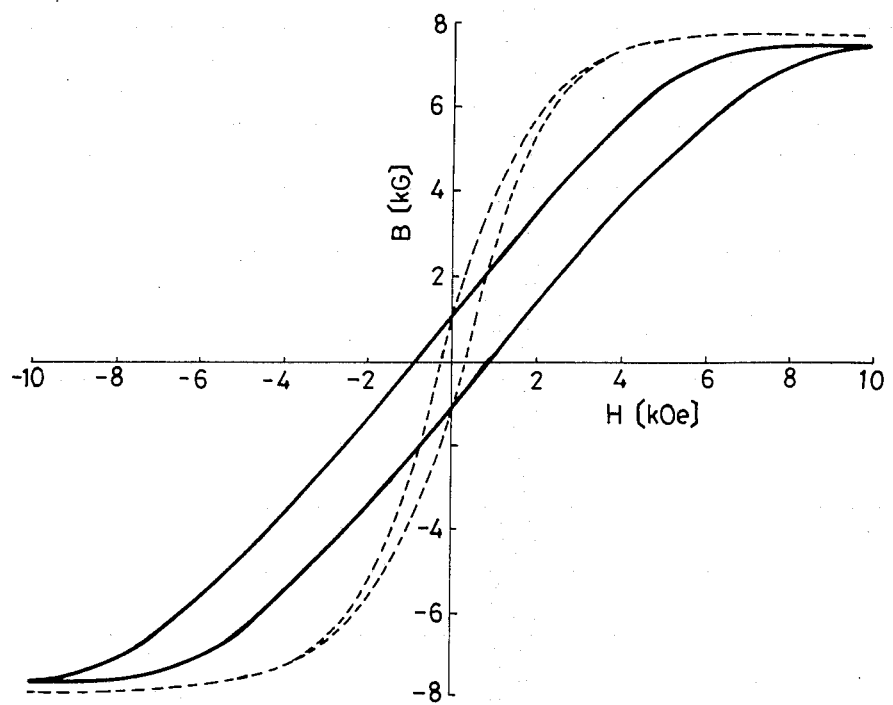
FIG. 3 is a diagram showing a B-H loop of the recording medium for perpendicular magnetization according to the present invention.

FIG. 3 shows a B-H loop of an alloy having a carbon content of 30 atomic % measured with a vibrating-sample magnetometer. The solid-line curve is indicative of characteristics in the perpendicular direction (1), and the dotted-line curve is indicative of characteristics in the horizontal direction (11) in the plane of the medium. The characteristic loo in the perpendicular direction (1) is shown inclined because of the influence of diamagnetism. A rectangular good B-H loop could be obtained by correcting the illustrated loop.

Figure 4:
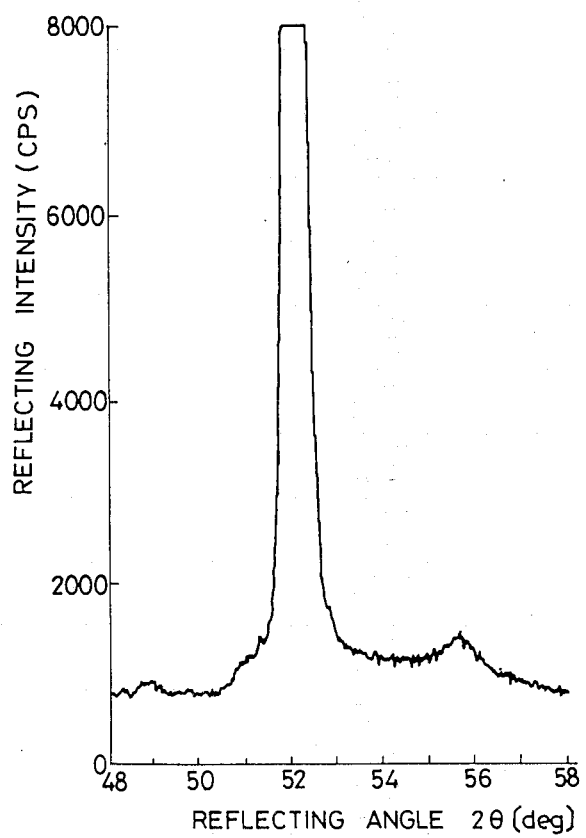
FIGS. 4 and 5 are diagrams illustrative of X-ray diffraction patterns of cobalt and a cobalt-carbon alloy.
Figure 5:
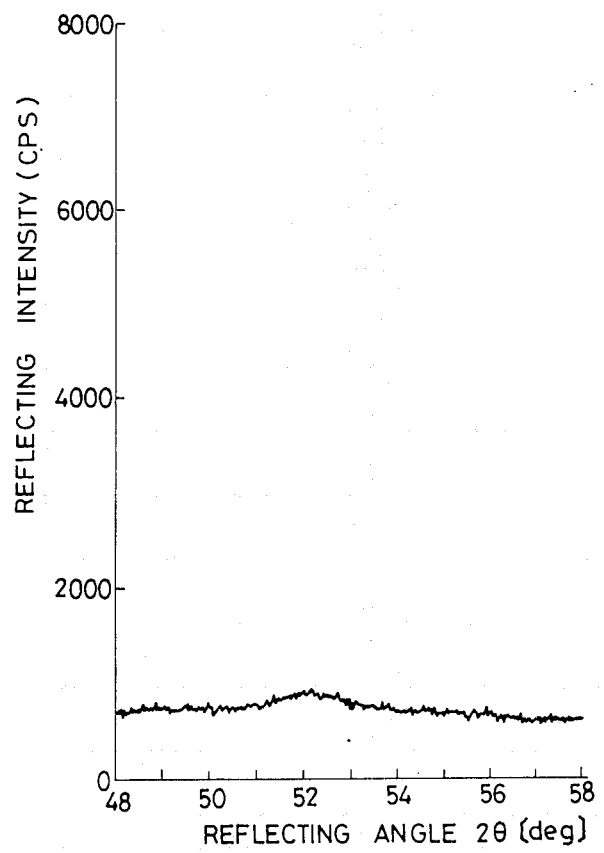

FIG. 4 shows an X-ray diffraction pattern of cobalt using a Co - Kα ray at 40 KV/20 mA. The pattern has a reflecting peak of (002) plane, which is inherent in a cobalt crystal, at a reflecting angle of 52 degrees. FIG. 5 illustrates an X-ray diffraction pattern of a cobalt-carbon alloy containing 30 automatic % of carbon, the pattern having no reflecting peak as shown in FIG. 4. The cobalt- carbon alloy is therefore assumed to be of amorphous or finely crystalline nature.

Figure 6:
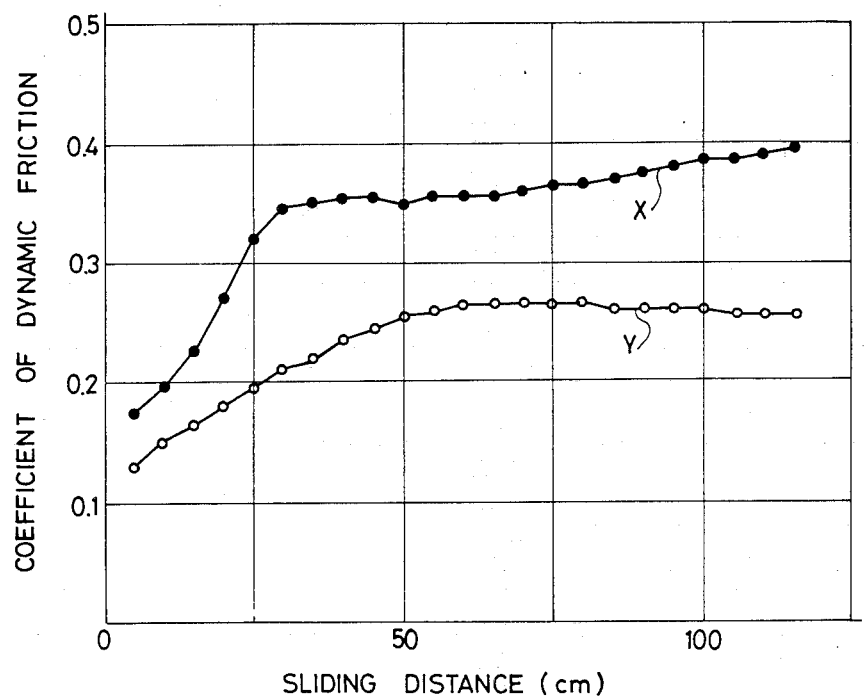
FIG. 6 is a diagram showing characteristic curves of coefficients of dynamic friction.

FIG. 6 is illustrative of variations in coefficients of dynamic friction of magnetic recording mediums. A curve X is a characteristic curve of a tape composed of a polyester base and a magnetic layer, 0.3 μm thick, formed by sputtering on the base and comprising a cobalt-chromium alloy containing 30 atomic % of carbon. Measuring conditions are such that a magnetic head core (maganese-zinc alloy ferrite) is held in contact with the magnetic layers under the load of 100 g and the tapes are fed along at a speed of 10 cm/min.

FIG. 6 clearly indicates that the Co - Cr alloy (curve X) has a coefficient of dynamic friction which rises sharply during an initial interval of tape travel and remains high thereafter, resulting in poor slidability, and the Co - C alloy (curve Y) has a coefficient of dynamic friction which is kept below 0.3 at all times even when the sliding distance is increased, thus exhibiting good slidability.

The present invention is also applicable to a magnetic recording medium including a magnetic layer having perpendicular magnetic anisotropy formed directly on the surface of a base.

With the arrangement of the present invention, a magnetic recording medium for perpendicular magnetization has good slidability for preventing itself and a magnetic head from being worn, and good magnetic characteristics such as a perpendicular anisotropic magnetic intensity and a coersive force.

Although a certain preferred embodiment has been shown and described, it should be understood that many changes and modifications may be made therein without departing from the scope of the appended claims.

What is claimed is:

1. A magnetic recording medium for perpendicular magnetization, comprising:
   (a) a base of a nonmagnetic material;
   (b) a magnetic layer having perpendicular magnetic anisotropy on at least a face side of said base; and
   (c) said magnetic layer being composed of a cobalt-carbon alloy with cobalt as a main component with carbon added thereto.

2. A magnetic recording medium according to claim 1, including a magnetic layer of a soft magnetic material interposed between said base and said magnetic layer on the face side thereof.

3. A magnetic recording medium according to claim 1 or 2, wherein the carbon in the magnetic layer on the face side of said base has a content in the range of from about 10 to 50 atomic %.

* * * * *